United States Patent [19]

Sirkar et al.

[11] Patent Number: 5,110,326
[45] Date of Patent: May 5, 1992

[54] IMMOBILIZED LIQUID MEMBRANE

[75] Inventors: K. K. Sirkar, Scotch Plains; R. R. Bhave, Hoboken; H. T. Taskier, Fanwood, all of N.J.; M. I. Ostler, Libertyville, Ill.

[73] Assignee: Celanese Corporation, New York, N.Y.

[21] Appl. No.: 668,356

[22] Filed: Mar. 12, 1991

Related U.S. Application Data

[60] Continuation of Ser. No. 458,551, Dec. 28, 1989, abandoned, which is a division of Ser. No. 761,133, Jul. 31, 1985, abandoned.

[51] Int. Cl.⁵ .................. B01D 53/22; B01D 69/00
[52] U.S. Cl. ................................... 55/158; 55/16
[58] Field of Search ............... 55/16, 158; 156/229; 264/4, 41, 145, 210.1, 342 R; 428/398

[56] References Cited

U.S. PATENT DOCUMENTS

| | | | |
|---|---|---|---|
| 3,335,545 | 8/1967 | Robb et al. | 55/16 |
| 3,396,510 | 8/1968 | Ward, III et al. | 55/158 X |
| 3,447,286 | 6/1969 | Dounoucos | 55/158 X |
| 3,503,186 | 3/1970 | Ward, III | 55/16 |
| 3,625,734 | 12/1971 | Ward, III | 55/16 X |
| 3,758,603 | 9/1973 | Steigelmann et al. | 55/16 X |
| 3,758,605 | 9/1973 | Hughes et al. | 55/16 X |
| 3,797,202 | 3/1974 | Neulander et al. | 55/158 |
| 3,801,404 | 4/1974 | Druin et al. | 156/229 |
| 3,812,651 | 5/1974 | Steigelmann | 55/16 |
| 3,819,806 | 6/1974 | Ward, III et al. | 55/16 X |
| 3,839,516 | 10/1974 | Williams et al. | 264/41 |
| 3,843,761 | 10/1974 | Bierenbaum et al. | 264/210 R |
| 3,844,735 | 10/1974 | Steigelmann et al. | 55/16 |
| 4,055,696 | 10/1977 | Kamada et al. | 428/398 |
| 4,089,653 | 5/1978 | Ward, III | 55/158 |
| 4,106,920 | 8/1978 | Hughes et al. | 55/158 |
| 4,115,514 | 9/1978 | Ward, III | 55/16 X |
| 4,117,079 | 9/1978 | Bellows | 55/158 X |
| 4,119,408 | 10/1978 | Matson | 55/158 X |
| 4,120,098 | 10/1978 | Manos | 55/16 X |
| 4,147,754 | 4/1979 | Ward, III | 55/16 X |
| 4,174,374 | 11/1979 | Matson | 55/16 X |
| 4,187,086 | 2/1980 | Walmet et al. | 55/158 X |
| 4,208,194 | 6/1980 | Nelson | 55/158 |
| 4,235,097 | 11/1980 | Kring | 422/88 X |
| 4,239,506 | 12/1980 | Steigelmann et al. | 55/16 |
| 4,255,376 | 3/1981 | Soehngen | 264/145 |
| 4,257,997 | 3/1981 | Soehngen et al. | 264/145 |
| 4,276,179 | 6/1981 | Soehngen | 210/679 |
| 4,405,688 | 9/1983 | Lowery et al. | 428/398 |
| 4,430,807 | 2/1984 | Davis et al. | 55/16 X |
| 4,564,373 | 1/1986 | Schmitz et al. | 55/16 |

FOREIGN PATENT DOCUMENTS

| | | | |
|---|---|---|---|
| 0098731 | 1/1984 | European Pat. Off. | |
| 0175322 | 3/1986 | European Pat. Off. | |
| 0179236 | 4/1986 | European Pat. Off. | |
| 2825789 | 1/1979 | Fed. Rep. of Germany | |
| 3225837 | 2/1983 | Fed. Rep. of Germany | |
| 52123 | 12/1981 | Japan | |
| WO86/05706 | 10/1986 | PCT Int'l Appl. | |
| 2025256 | 1/1980 | United Kingdom | 55/16 |
| 1577547 | 10/1980 | United Kingdom | |

OTHER PUBLICATIONS

Kimura et al., "Fuel Gas Purification with Permselective Membranes", Separation Science & Technology, 15(4), 1980, pp. 1115-1133.

Way et al., Journal of Membrane Science, (12) 1982, pp. 239-241.

M. Kawakami et al., "Effects of Dissolved Inorganic Salts on Gas Permeabilities of Immobilized Liquid Polyethylene Glycol Membranes", J. Poly Sci., Poly Letters Ed., (vol. 20) 1982, pp. 251-257.

R. Kesting, "Synthetic Polymeric Membranes a Structural Perspective", 2nd ed., 1985, pp. 311 and 314.

*Primary Examiner*—Robert Spitzer
*Attorney, Agent, or Firm*—K. A. Genoni; J. M. Brown; B. H. Davidson (List continued on next page.)

[57] ABSTRACT

The present invention is a single-ply immobilized liquid membrane comprising an aqueous liquid membrane immobilized within a hydrophobic microporous support.

11 Claims, 1 Drawing Sheet

OTHER PUBLICATIONS

F. Brescia et al., "Fundamentals of Chemistry a Modern Introduction", 1970, pp. 15, 16 and 745.

Kimura et al., Recent Developments in Separation Science, vol. V, Chapter 2, pp. 11–25.

Ward, III, Recent Developments in Separation, Science, vol. 1, pp. 153–161.

R. R. Bhave et al., J. Membrane Sci., 27(1986), pp. 41–61, May, No. 1.

K. K. Sirkar, "Measurement of Gas Permeability of Reactive Liquid Membranes Immobilized in Celgard Films", May 31, 1983, pp. 1–59.

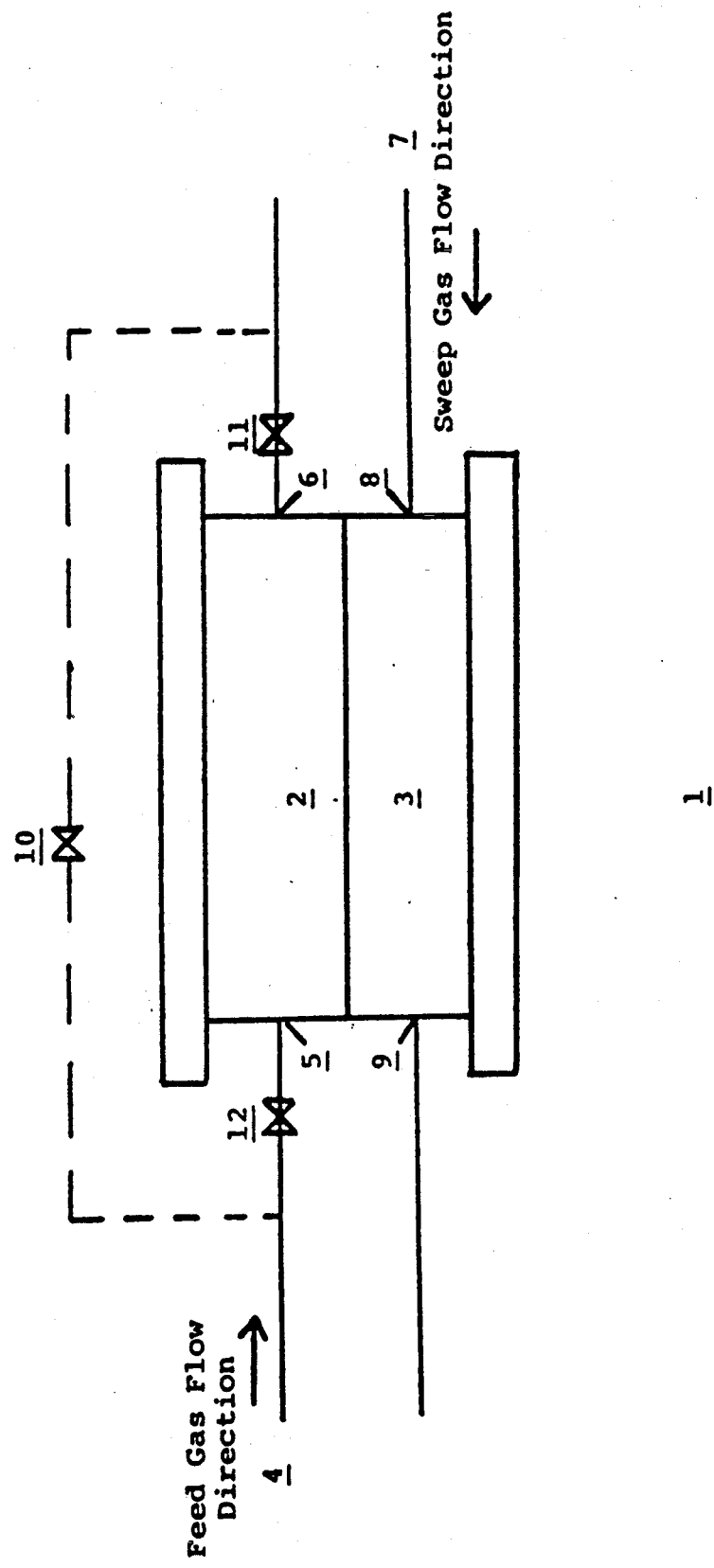

IMMOBILIZED LIQUID MEMBRANE

This application is a continuation of application Ser. No. 07/458,551 filed on Dec. 28, 1989 (abandoned), which was a division of application Ser. No. 06/761,133 filed on Jul. 31, 1985 (abandoned).

BACKGROUND OF THE INVENTION

The present invention provides a stable, efficient, single-ply, immobilized liquid membrane comprising an aqueous liquid membrane immobilized within a hydrophobic microporous support, and a method of preparing such an immobilized liquid membrane. The present invention also includes a method of preparing an ultrathin immobilized liquid membrane having a thickness of about 0.0084 mm or less.

The removal of a gaseous component from a gaseous mixture by an immobilized liquid membrane is well-known. Typically, such conventional immobilized liquid membranes are prepared by immersing a hydrophilic microporous membrane in a suitable aqueous solution. The hydrophilic membrane draws up the aqueous solution into its pores such that the solution in the pores acts as membrane so as to preferentially separate a gaseous component from a gaseous mixture. That is, one of the species in a gaseous mixture preferentially permeates through the liquid in the pores.

The conventional immobilized liquid membrane consists of an aqueous liquid membrane immobilized within a hydrophilic microporous membrane. The immobilized liquid membrane is then supported on a hydrophobic microporous support membrane on the lower pressure side to prevent expulsion of the immobilized aqueous liquid serving as the membrane. Examples of such a sandwich structure may be found in U.S. Pat. Nos. 3,819,806; 4,089,653; 4,115,514; 4,119,408; 4,147,754 and 4,174,374. When flat microporous membranes are used and a positive pressure difference exists between the two sides of the immobilized liquid membrane, the sandwich structure described above is further supported by a flat, fine mesh stainless steel screen. See, Kimura and Walmet, "Fuel Gas Purification With Permselective Membranes", *Separation Science and Technology*, 15 (4), p.p. 1115-1133 (1980). When hydrophilic microporous hollow fiber support membranes are used to immobilize aqueous liquids, the application of a positive pressure difference is avoided to prevent the expulsion of the aqueous liquid from the membrane. *Id.*

Conventional immobilized liquid membranes also inherently suffer from their hydrophilic composition, for when a gaseous component is removed from a feed gas mixture that contains water, the residual feed gas mixture becomes supersaturated. Water condenses on the hydrophilic membrane, and floods it. Thus such immobilized liquid membranes require very careful humidity control. *Id.* at p. 1128.

Furthermore, as disclosed in U.S. Pat. No. 4,119,408, it requires specialized process steps to replenish liquid loss in a conventional sandwich structure immobilized liquid membranes in an online gas separation system. However, the ultrathin immobilized liquid membrane of the present invention may be easily replenished from the downstream side to compensate for any liquid loss.

U.S. Pat. No. 3,625,734 discloses an immobilized liquid membrane comprising aqueous polyethylene glycol supported on a porous, inert backing membrane having deposited thereon a non-wetting microporous film of particles of polytetrafluoroethylene. To deposit the immobilized liquid film of polyethylene glycol directly on the polytetrafluoroethylene coated backing membrane, the membrane is made wettable by spraying it with a dilute aqueous solution that contains hydroxymethyl cellulose. Such an immobilized liquid membrane is thus difficult to prepare and will suffer from problems such as liquid expulsion at even low applied pressure differences as well as from liquid membrane flooding on the feed side.

Japanese Patent Publications No. 52123/1981 discloses that porous, hollow polypropylene filaments can be made hydrophilic by immersing the filaments in ethanol and then passing water through the filaments. The fibers are used to filter fine particles from aqueous solution. This reference does not mention immobilized liquid membrane technology, and does not suggest immobilizing aqueous solutions within the porous, hollow polypropylene fibers.

The disadvantages of the conventional immobilized liquid membranes are overcome by the present invention. First, once the aqueous membrane is immobilized within the hydrophobic microporous support, it is not expelled under a substantial positive pressure difference, e.g. 175 psig, applied across the membrane. Such positive pressure difference stability is wholly unexpected in a single-ply immobilized liquid membrane.

This high positive pressure difference stability means that if the microporous hydrophobic support can support mechanically the pressure difference in any given application, the conventional sandwich structure is not needed, and the immobilized liquid membrane of the present invention can stand alone. This ability to function without support provides for ease of service and cost-effectiveness as compared to conventional immobilized liquid membranes.

Second, if condensation of water due to supersaturation of the feed gas mixture occurs, the liquid membrane immobilized in the hydrophobic microporous support of the present invention will not flood. Also, if the aqueous liquid membrane is immobilized within hydrophobic microporous hollow fiber, it is stable at significant levels of applied pressure difference, especially if the higher pressure exists on the outside of the hollow fiber.

To maximize flux through a membrane and reduce the area required for a given separation, it is generally preferable to utilize as thin a membrane as possible. The present invention thus also includes a method of preparing an ultrathin, single-ply immobilized liquid membrane. Specifically, the thickness of the aqueous liquid membrane immobilized in the microporous hydrophobic support is reduced by partially removing, e.g., by evaporation, the aqueous liquid in the membrane. As the support is hydrophobic, the remaining aqueous liquid does not migrate to dried sections of the support. The ultrathin immobilized liquid membranes of the present invention have a thickness of less than about 0.0084 mm.

Therefore, it is an object of the present invention to provide a single-ply immobilized liquid membrane comprising an aqueous liquid membrane immobilized within a hydrophobic microporous support, and a method of preparing such an immobilized liquid membrane.

It is also an object of the present invention to provide a single-ply immobilized liquid membrane stable at substantial positive pressure differences applied across the membrane.

It is also an object of the present invention to provide a single-ply immobilized liquid membrane that is easy to service and relatively inexpensive to fabricate.

It is also an object of the present invention to provide an immobilized liquid membrane that resists flooding.

It is also an object of the present invention to provide an aqueous liquid membrane immobilized within hydrophobic microporous hollow fiber with the immobilized liquid membrane being stable to high levels of applied pressure difference.

It is also an object of the present invention to provide an ultrathin, single-ply immobilized liquid membrane, and a method of preparing such a membrane.

It is also an object of the present invention to provide an ultrathin, single-ply immobilized liquid membrane that exhibits superior separation ability.

SUMMARY OF THE INVENTION

The present invention provides a single-ply immobilized liquid membrane comprising an aqueous liquid membrane immobilized within a hydrophobic microporous support, and the process for making such an immobilized liquid membrane. That process comprises the following steps: (a) contacting a hydrophobic microporous support with an aqueous solution containing from about 40 to about 95 percent by volume of an exchange component until steady state is achieved; (b) removing the support from the aqueous solution; (c) contacting the support with water without appreciable surface drying until steady state is achieved; (d) removing the support from the water; and (e) repeating steps (a)-(d) until a water membrane is immobilized within subtantially the entire thickness of the support.

The present invention also provides a method for immobilizing an aqueous salt solution within the hydrophobic microporous support, by including a further step (f) whereby the support contacts an aqueous salt solution bath until an aqueous salt solution membrane replaces the water membrane in the support.

Finally, the present invention provides a method for preparing a single-ply, ultrathin immobilized liquid membrane comprising the following steps: a) contacting a hydrophobic microporous support with an aqueous solution containing from about 40 to about 95 percent by volume of an exchange component until steady state is achieved; (b) removing the support from the aqueous solution; (c) contacting the support with water without appreciable surface drying until steady state is achieved; (d) removing the support from the water; and (e) repeating steps (a)-(d) until a water membrane is immobilized within subtantially the entire thickness of the support; and (f) partially reducing the thickness of the membrane immobilized within the support. The ultrathin immobilized liquid membrane of the present invention may comprise an aqueous salt membrane immobilized within the support.

DESCRIPTION OF THE DRAWINGS

The FIGURE is a schematic representation of the apparatus used to evaluate the gas permeability of the immobilized liquid membrane of the present invention. It is described in Example 5.

DETAILED DESCRIPTION OF THE INVENTION

The product and process provided by the present invention relates to a single-ply, immobilized liquid membrane comprising an aqueous liquid membrane immobilized with a hydrophobic microporous support.

THE MICROPOROUS SUPPORT

In one embodiment of the present invention, the hydrophobic microporous support are the microporous films of the type described below and disclosed in U.S. Pat. Nos. 3,801,404; 3,839,516; 3,843,761; 4,255,376; 4,257,997; and 4,276,179 which are all herein incorporated by reference. It should be noted that any hydrophobic microporous material may be used in the present invention. These include any microporous material not spontaneously wet by water.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the pores of the microporous films of the present invention are microscopic, i.e., the details of their pore configuration or arrangement are discernible only by microscopic examination. In fact, the open cells or pores in the films prepared by the "dry stretch" or "solvent stretch" techniques described herein generally are smaller than those which can be measured using an ordinary light microscope, because the wavelength of visible light, which is about 5,000 Angstroms (an Angstrom is one tenbillionth of a meter), is longer than the longest planar or surface dimension of the open cell or pore. The microporous films prepared by the "solvent stretch" or "dry stretch" method may be identified, however, by using electron microscopy techniques which are capable of resolving details of pore structure below 5,000 Angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric materials but having no open celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volume-nometer method, and is described in the Encyclopedia of Chemical Technology, Vol. 4, page 892 (Interscience 1949). Thus, the adsorbent (e.g., porous film) of the present invention possess a microporous open-celled structure, and is also characterized by a reduced bulk density.

For example, suitable microporous films may be prepared in accordance with the processes described in U.S. Pat. No. 3,801,404, which defines a method for preparing microporous films herein referred to as the "dry stretch" method and U.S. Pat. No. 3,839,516 which defines a method for preparing microporous films herein referred to as the "solvent stretch" method, both of which are herein incorporated by reference. Each of these patents discloses preferred alternative routes for obtaining a microporous film by manipulating a precursor film in accordance with specifically defined process steps.

The most preferred hydrophobic microporous films for use as supports in the present invention are the CELGARD ® 2000 series polypropylene microporous films available from Celanese Separations Products, Celanese Corporation, Charlotte, North Carolina.

In another embodiment of the present invention, the hydrophobic microporous support is a microporous hollow fiber.

Again, it should be understood in characterizing the microporous hollow fibers of the present invention that porous or cellular fiber structures can be classified into two general types: one type in which the pores are not interconnected, i.e., a closed-cell structure, and the other type in which the pores are essentially interconnected through more or less tortuous paths which may extend from one exterior surface or surface region to another, i.e., an open-celled structure. The porous hollow fibers of the present invention are of the latter type.

U.S. Pat. No. 4,055,696, hereby incorporated by reference, describes a process for the preparation of microporous polypropylene hollow fibers wherein a cold stretching technique is employed to prepare the hollow polypropylene microporous fibers. This process requires that the size of the pores be kept within a specified range by limiting the degree and temperature of cold stretch to 30 to 200% of the original fiber length and less than 110° C., respectively. The resulting cold stretched fibers which have been previously annealed are heat set at a temperature at or above the initial annealing temperature, employed prior to stretching as described above. Annealed, cold stretched, heat set, hollow fibers prepared in accordance with this patent tend to exhibit varying degrees of shrinkage depending on the relationship of the prior annealing temperature and duration to the heat setting temperature and duration.

A preferred method of producing the microporous hollow fiber utilized as the support in present invention is disclosed in U.S. Pat. No. 4,405,688, hereby incorporated by reference, wherein a microporous polyolefinic hollow fiber is made by melt spinning a polyolefinic resin in a substantially vertically upward direction at a temperature of from about 10 to about 90° C. above the crystalline melting point of the polymer into a nonporous hollow precursor fiber while contacting the precursor with a substantially symmetric flow of a quenching medium such as air or other gas, and then converting the resulting non-porous hollow precursor fiber into a microporous hollow fiber by stretching the precursor fiber and then heat setting the stretched fiber. Preferably the precursor fiber is also annealed prior to stretching.

The most preferred hydrophobic microporous hollow fibers utilized as supports in the present invention are CELGARD ® microporous hollow fiber available from Celanese Separations Products, Celanese Corporation, Charlotte, North Carolina.

THE SINGLE-PLY IMMOBILIZED LIQUID MEMBRANE OF THE PRESENT INVENTION

The single-ply, immobilized liquid membrane of the present invention comprises a hydrophobic microporous support which has immobilized within its pores an aqueous liquid membrane. The aqueous liquid membrane is incorporated within the support by the following exchange process.

The hydrophobic microporous support is placed into contact with an aqueous solution containing from about 40 to about 95 percent by volume of an exchange component. The exchange component is most preferably ethyl alcohol but may be any water miscible liquid or mixture of liquids that, when mixed with water in an appropriate amount, renders the support spontaneously wettable by an aqueous solution. To render CELGARD ® hydrophobic microporous films wettable, the exchange component will have a surface tension value of less than or equal to 35 dyne/cm at 25° C. Preferred exchange components include methyl alcohol, acetone, and ethyl alcohol; with ethyl alcohol being most preferred.

A preferred method of contacting the support with the aqueous solution of the exchange component is to place the support in a stream of the aqueous solution within a bath with gentle agitation. The support remains in contact with the aqueous solution until steady state is achieved.

The support is then removed from contact with the aqueous solution of the exchange component and placed in contact with water, preferably, without appreciable surface drying, until steady state is again achieved.

The support is removed from the water and the successive steps of contacting the support with an aqueous solution of an exchange component, removal from such contact, and contacting the support with water are repeated until a water membrane is immobilized within substantially the entire thickness of the support. Such a point may be determined qualitatively by observing when the support is completely transparent to light. A test with a UV spectrophotometer for light transmission will quickly verify complete transparency.

The so-called "fully exchanged" support is a single-ply, immobilized liquid membrane comprising a water membrane immobilized within a hydrophobic microporous support. If it is desired to immobilize an aqueous salt solution within the support, the "fully exchanged" support may be placed into contact with the aqueous salt solution until an aqueous salt solution replaces the water membrane. A preferred method of achieving such contact is by immersing the "fully exchanged" support in the aqueous salt solution for several hours. The aqueous salt solution may contain any ion or mixture of ions compatible with the support, and which promote the selective passage of a gaseous molecule through the immobilized liquid membrane of the present invention. These include, $CO_3^{-2}$, $HCO_3^{-1}$, $Cl^{-1}$, $I^{-1}$, $SO_4^{-2}$, $ClO_4^{-1}$, $NO_3^{-1}$, $PO_4^{-3}$, $HPO_4^{-1}$, $S^{-2}$.

The present invention also includes a single-ply, ultrathin immobilized liquid membrane, and the method for producing such a membrane. It is well known that to maximize the flux through any given membrane and to reduce the area needed for any given separation, it is advantageous to use as thin a membrane as possible. In the present invention, the thickness of the aqueous liquid membrane immobilized in the microporous hydrophobic support may be reduced by partially removing, e.g., by evaporation, the aqueous liquid in the membrane.

This reduction in the thickness of the membrane immobilized in the support may be accomplished in numerous ways. Preferably, a stream of dry gas or partially humidified gas is blown over the immobilized liquid membrane. The blowing may be done on either side of the support by any gas that does not interact with the membrane or the support. Preferably, the side of the support not in contact with the gas stream is not in contact with any gas flow. So long as there is a gradient in moisture partial pressure from the surface of the support to the gas stream, evaporation will occur and the thickness of the aqueous liquid membrane immobilized within the support will be reduced.

Alternatively, a vacuum may be applied so as to remove a portion of the aqueous liquid membrane. Also, the immobilized liquid membrane may be passed through a chamber at a controlled rate. The atmosphere of the chamber is maintained at conditions, e.g., elevated temperature, facilitating transfer of liquid from the pores of the support to the atmosphere of the chamber. It should be noted that if evaporation occurs from both sides of the support, no subsequent exchange with the liquid membrane is possible, i.e., the exchange of a water membrane with an aqueous salt solution, as the evaporated portions of the hydrophobic support are nonwettable by aqueous solutions that do not contain an exchange component.

It is also within the ambit of the present invention to produce single-ply, ultrathin immobilized liquid membrane wherein an aqueous salt solution membrane is immobilized within a hydrophobic microporous support. Such an immobilized liquid membrane may be produced by contacting a support wherein a water membrane is immobilized within substantially the entire thickness of the support with an aqueous salt solution until the salt solution replaces the water membrane, and subsequently partially reducing, as described above, the thickness of the aqueous salt solution membrane immobilized within the support.

Alternatively, an immobilized liquid membrane of the present invention wherein the thickness of the water membrane immobilized within the support has been partially reduced, may be placed in contact with an aqueous salt solution until salt solution of reduced thickness replaces the water membrane of reduced thickness.

The following Examples are given as specific illustrations of the invention. It should be understood, however, that the invention is not limited to the specific details set forth in the Examples.

EXAMPLE 1

A CELGARD ® 2400 hydrophobic microporous film 0.00254 cm thick and 5.08 cm in diameter was placed in an aqueous solution comprising 40 percent by volume of ethyl alcohol. The solution was gently stirred for 1 minute and the film was removed. The film was placed in water without appreciable surface drying, gently stirred for 5 minutes, and removed. The film was placed in an aqueous solution comprising 40 percent by volume of ethyl alcohol, gently stirred for 1 minute, and transferred to a water bath. The water was stirred for 5 minutes. These steps of contacting the film with an aqueous solution comprising 40 percent by volume of ethyl alcohol for one minute and transferring the film to a water bath for 5 minutes was repeated until the film became completely transparent to light. This transparency indicated that the microporous film had become fully exchanged with water.

EXAMPLE 2

A microporous polyethylene film 0.00254 cm thick and 5.08 cm in diameter was placed in an aqueous solution comprising 40 percent by volume ethyl alcohol. The film was processed in the same manner as elaborated in Example 1, and was observed to become completely transparent to light. Again, this transparency indicated that the microporous film had become fully exchanged with water.

EXAMPLE 3

A microporous polytetrafluoroethylene film 0.00381 cm thick was placed in an aqueous solution comprising 95 percent by volume ethyl alcohol. The film was processed in the same manner as elaborated in Example 1, and was observed to become completely transparent to light. This transparency indicated that the microporous film had become fully exchanged with water.

EXAMPLE 4

A fully water exchanged Celgard ® 2400 film was immersed in an aqueous $K_2CO_3$ solution for several hours with occasional gentle stirring. Gas permeation tests with pure $N_2$ were subsequently run on the film. The resultant gas permeation rate was found to be much lower than water and, when compared to theoretical rates and consideration, such rate was indicated that the microporous film had become fully exchanged with the aqueous $K_2CO_3$ solution.

EXAMPLE 5

A fully water exchanged CELGARD ® 2400 film 0.00254 cm thick was scrubbed with a dry CELGARD ® 2400 film to remove any surface moisture and was placed in permeation cell shown in the FIGURE. The permeation cell 1 has a top half 2 and a bottom half 3 such that the film was disposed between top half 2 and bottom half 3. A pure, completely humidified (i.e., 100% relative humidity) nitrogen feed gas at 593 cm Hg and a flow rate of 15 cm$^3$/min was fed through line 4 into entrance 5 and out exit 6 of top half 2. A pure, completely humidified helium sweep gas at approximately atmospheric pressure and a flow rate of 10 cm$^3$/min was fed through line 7 into entrance 8 and at exit 9 of bottom half 3. At 24° C., a permeation rate of $N_2$ of $1.42 \times 10^{-3}$ std cm$^3$/sec for the fully water exchanged film 0.00254 cm thick was conventionally determined by gas chromatograph analysis of the helium sweep gas after the sweep gas exited permeation cell 1 at exit 9.

The following evaporation procedure was then used to partially reduce the thickness of the membrane immobilized within the CELGARD ® film. The nitrogen feed gas flow was bypassed around permeation cell 1 by opening bypass valve 10 and closing valves 11 and 12. A pure dry helium sweep gas at approximately atmospheric pressure and flowing at 15 cm$^3$/min was then fed through line 7 into entrance 8 and out exit 9 of bottom half 3. After 6 minutes elapsed, the sweep gas flow was stopped and restarted for 2 minutes. The pure dry helium sweep gas flow was stopped.

Bypass valve 10 was closed and valves 11 and 12 were opened. A pure, completely humidified nitrogen feed gas at 593 cm Hg and a flow rate of 15 cm$^3$/min was fed through line 4 into entrance 5 and at exit 6 of top half 2. A pure, completely humidified helium sweep gas approximately atmospheric pressure and a flow rate of 10 cm$^3$/min was fed through line 7 into entrance 8 and at exit 9 of bottom half 3. At 24° C. a permeation rate of $N_2$ of $2.12 \times 10^{-3}$ std cm$^3$/sec was conventionally determined by gas chromatograph analysis as before. From such a permeation rate, the thickness of the liquid membrane immobilized within the CELGARD® film was conventionally calculated to have been reduced from 0.00254 cm to 0.001675 cm. The permeation rate of $N_2$ was found to be constant through this ultrathin immobilized liquid membrane for hours, indicating a highly stable immobilized liquid membrane.

The same evaporation technique described above was repeated for a shorter period (1 or 2 minutes) and a permeation rate of $N_2$ of $4.26 \times 10^{-3}$ std cm$^3$/sec was calculated. Such a permeation rate indicated that the thickness of the liquid membrane immobilized within the CELGARD® film had been reduced to 0.000838 cm. Again, this ultrathin immobilized liquid membrane was found to be highly stable.

The same evaporation technique was repeated for a short period (1 or 2 minutes) and a permeation rate of $N_2$ of $9.46 \times 10^{-3}$ std cm$^3$/sec was calculated. This permeation rate indicated that the thickness of the liquid membrane immobilized within the CELGARD® film had been reduced to 0.000406 cm. This ultrathin immobilized liquid membrane was also found to be highly stable. Thus, the final membrane thickness of 0.000406 cm in the film was obtained through a stepwise reduction of liquid film thickness starting with a fully water exchanged film, 0.00254 cm thick. However, the stepwise thickness reduction may be replaced by a one step process.

EXAMPLE 6

A fully water exchanged CELGARD® film 0.00254 cm thick was placed in permeation cell 1 as in Example 5. A completely humidified feed gas mixture containing 10.1% $CO_2$ and 89.9% $N_2$ at approximately 175 psig and a flow rate of 15 cm$^3$/min was fed through permeation cell 1 in like manner as the feed gas in Example 5. A completely humidified helium gas at approximately atmospheric pressure and a flow rate of 10 cm$^3$/min was passed through permeation cell 1 as the sweep gas as in Example 5.

The partial pressure difference of $N_2$, $\Delta P(N_2)$, across the film was 880.8 cm Hg while that for $CO_2$, $\Delta P(CO_2)$, was 88.2 cm Hg. A permeation rate of $N_2$, $R(N_2)$, of $1.88 \times 10^{-3}$ std cm$^3$/sec was calculated while that of $CO_2$, $R(CO_2)$, was $5.38 \times 10^{-3}$ std cm$^3$/sec. The separation factor between $CO_2$ and $N_2$, $\alpha CO_2 - N_2$, defined as $(R(CO_2)/\Delta P(CO_2)/(R(N_2)/\Delta P(N_2))$ was found to be 28.6.

The evaporation procedure as in Example 5 was performed except that the high pressure $CO_2 - N_2$ humidified feed gas mixture was fed with the humidified helium sweep feed gas into bottom half 3 before permeation rate measurements were taken. The nitrogen permeation rate $R(N_2)$, was calculated to be $3.96 \times 10^{-3}$ std cm$^3$/sec, while that for $CO_2$, $R(CO_2)$, was $9.88 \times 10^{-3}$ std cm$^3$/sec. $\Delta P(N_2)$ was now found to be 880.0 cm Hg and $\Delta P(CO_2)$ was now 78.3 cm Hg. A separation factor $\alpha CO_2 - N_2$ was calculated to be 28.0. Thus, the species flux had increased by two times indicating a reduction in the thickness of the liquid membrane from 0.00254 cm to about 0.00127 cm. Moreover, the separation factor had remained almost unchanged even with a partial reduction in the thickness of the liquid membrane immobilized within the CELGARD® film.

The evaporation procedure described above was repeated and $R(N_2)$ and $R(CO_2)$ were found to be $8.05 \times 10^{-3}$ std cm$^3$/sec and $14.71 \times 10^{-3}$ std cm$^3$/sec, respectively, with $\Delta P(N_2) = 878.4$ cm Hg and $\Delta P(CO_2) = 66.5$ cm Hg. The value of $\alpha CO_2 - N_2$ was calculated to be 24.2. The thickness of the liquid membrane was calculated to be about 0.00059 cm yet the separation factor $\alpha CO_2 - N_2$ was basically unchanged.

EXAMPLE 7

A fully water-exchanged CELGARD® film 0.00254 cm thick was placed in permeation cell 1 as in Example 5. A completely humidified 9.91% $CO_2$ - 90.09% $N_2$ feed gas mixture at approximately 102 psig and a flow rate of 15 std cm$^3$/min was fed through permeation cell 1 in like manner as the feed gas in Example 5. A completely humidified helium sweep gas at approximately atmospheric pressure and a flow rate of (15 cm$^3$/min) was passed through permeation cell 1 as the sweep gas as in Example 5.

The $\Delta P(N_2)$ and $\Delta P(CO_2)$ values were found to be 543.2 cm Hg and 55.70 cm Hg, respectively. A permeation rate of $N_2$, $R(N_2)$, of $1.12 \times 10^{-3}$ std cm$^3$/sec was calculated, while that of $CO_2$, $R(CO_2)$, was $3.3 \times 10^{-3}$ std cm$^3$/sec. The separation factor, $\alpha CO_2 - N_2$, was found to be 28.7.

The evaporation procedure of Example 5 was performed. The film was found to have $R(N_2) = 2.5 \times 10^{-3}$ std cm$^3$/sec and $R(CO_2) = 6.1 \times 10^{-3}$ std cm$^3$/sec. The thickness of the liquid membrane immobilized within the film was calculated to be about 0.00127 cm. Separation factor $\alpha CO_2 - N_2$ was found to be 25.4.

All processes were halted and the film was transferred from permeation cell 1 to a bath of an aqueous salt solution of 30 percent $K_2CO_3$. After 3 hours the exchange was considered complete such that an aqueous salt solution of 30 weight percent $K_2CO_3$ comprised a 0.00127 cm thick liquid membrane immobilized within the film.

The immobilized liquid membrane comprising an aqueous liquid salt solution membrane immobilized within the hydrophobic microporous CELGARD® film support was placed in permeation cell 1 and evaluated for permeation and separation characteristics as described above. $\Delta P(N_2)$ was 543.2 cm Hg and $\Delta P(CO_2)$ was 54.40 cm Hg. $R(N_2)$ was found to be drastically reduced by almost a factor of ten to $0.28 \times 10^{-3}$ std cm$^3$/sec, while $R(CO_2)$ was marginally reduced to $4.24 \times 10^{-3}$ std cm$^3$/sec. The separation factor $\alpha CO_2 - N_2$ was increased dramatically to 151.4.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A single-ply, ultrathin immobilized liquid membrane having high positive pressure difference stability comprising a single ply hydrophobic microporous support, and an aqueous liquid membrane immobilized within said support, said immobilized liquid membrane constituting the means which permit a specie of a gaseous feed mixture on one side of said support to preferentially permeate through said support to a gas on the other side of said support said immobilized liquid membrane being produced by a method comprising the steps of:

(a) contacting said single-ply hydrophobic microporous support with an aqueous solution containing from about 40 to about 95 percent by volume of an exchange component until steady state is achieved;
(b) removing said support from said aqueous solution;
(c) contacting said support with water until steady state is achieved;
(d) removing said support from said water;
(e) repeating steps (a)–(d) until a water membrane is immobilized within substantially the entire thickness of said support; and
(f) partially reducing the thickness of said membrane immobilized within said support by (i) establishing a moisture partial pressure gradient between at least one side of said support and a gas in contact with said one side, and (ii) maintaining said moisture partial pressure gradient for a time sufficient to cause a portion of said liquid membrane to evaporate thereby partially reducing its thickness.

2. The immobilized liquid membrane of claim 1 wherein said aqueous liquid membrane is selected from the group consisting of water and aqueous salt solutions.

3. The immobilized liquid membrane of claim 2 wherein said aqueous salt solution contains an ion or a mixture of ions which promote the selective passage of gaseous molecules through said membrane.

4. The immobilized liquid membrane of claim 2 wherein said aqueous salt solution contains ions selected from the group consisting of $CO_3^{-2}$, $HCO_3^{-1}$, $ClO_4^{-1}$, $Cl^{-1}$, $I^{-1}$, $SO_4^{-2}$, $HPO_4^{-1}$, $PO_4^{-3}$, $NO_3^{-1}$, $S^{-2}$ and mixtures thereof.

5. The immobilized liquid membrane of claim 1 wherein said hydrophobic support is comprised of material that is not spontaneously wet with water.

6. The immobilized liquid membrane of claim 5 wherein said hydrophobic microporous support is comprised of material selected from the group consisting of polypropylene, polyethylene, polytetrafluoroethylene, polystyrene, polyvinylidene fluoride, and polyvinyl fluoride.

7. The immobilized liquid membrane of claim 1 wherein said hydrophobic microporous support comprises microporous hollow fibers.

8. The immobilized liquid membrane of claim 1 wherein said hydrophobic microporous support comprises microporous film.

9. A single-ply, ultrathin immobilized liquid membrane having high positive pressure difference stability comprising a single-ply polyethylene hydrophobic microporous support and an aqueous liquid membrane immobilized within said support, said immobilized liquid membrane constituting the means which permit a specie of a gaseous feed mixture on one side of said support to preferentially permeate through said support to a gas on the other side of said support said immobilized liquid membrane being produced by a method comprising the steps of:
(a) contacting said single-ply hydrophobic microporous support with an aqueous solution containing from about 40 to about 95 percent by volume of an exchange component until steady state is achieved;
(b) removing said support from said aqueous solution;
(c) contacting said support with water until steady state is achieved;
(d) removing said support from said water;
(e) repeating steps (a)–(d) until a water membrane is immobilized within substantially the entire thickness of said support; and
(f) partially reducing the thickness of said membrane immobilized within said support by (i) establishing a moisture partial pressure gradient between at least one side of said support and a gas in contact with said one side, and (ii) maintaining said moisture partial pressure gradient for a time sufficient to cause a portion of said liquid membrane to evaporate thereby partially reducing its thickness.

10. A single-ply, ultrathin immobilized liquid membrane having high positive pressure difference stability comprising a single-ply polytetrafluoroethylene hydrophobic microporous support and an aqueous liquid membrane immobilized within said support, said immobilized liquid membrane constituting the means which permit a specie of a gaseous feed mixture on one side of said support to preferentially permeate through said support to a gas on the other side of said support said immobilized liquid membrane being produced by a method comprising the steps of:
(a) contacting said single-ply hydrophobic microporous support with an aqueous solution containing from about 40 to about 95 percent by volume of an exchange component until steady state is achieved;
(b) removing said support from said aqueous solution;
(c) contacting said support with water until steady state is achieved;
(d) removing said support from said water;
(e) repeating steps (a)–(d) until a water membrane is immobilized within substantially the entire thickness of said support; and
(f) partially reducing the thickness of said membrane immobilized within said support by (i) establishing a moisture partial pressure gradient between at least one side of said support and a gas in contact with said one side, and (ii) maintaining said moisture partial pressure gradient for a time sufficient to cause a portion of said liquid membrane to evaporate thereby partially reducing its thickness.

11. A single-ply, ultrathin immobilized liquid membrane having high positive pressure difference stability comprising a single-ply hydrophobic microporous support, and an ultrathin aqueous liquid membrane immobilized within said support so as to not be expelled therefrom when a high positive pressure difference is applied thereacross, said liquid membrane having a reduced thickness, as compared to the thickness of said support in which said liquid membrane is immobilized, prior to the application of said high positive pressure difference said immobilized liquid membrane constituting the means which permit a specie of a gaseous feed mixture on one side of said support to preferentially permeate through said support to a gas on the other side of said support said immobilized liquid membrane being produced by a method comprising the steps of:
(a) contacting said single-ply hydrophobic microporous support with an aqueous solution containing from about 40 to about 95 percent by volume of an exchange component until steady state is achieved;
(b) removing said support from said aqueous solution;
(c) contacting said support with water until steady state is achieved;
(d) removing said support from said water;
(e) repeating steps (a)–(d) until a water membrane is immobilized within substantially the entire thickness of said support; and
(f) partially reducing the thickness of said membrane immobilized within said support by (i) establishing a moisture partial pressure gradient between at least one side of said support and a gas in contact with said one side, and (ii) maintaining said moisture partial pressure gradient for a time sufficient to cause a portion of said liquid membrane to evaporate thereby partially reducing its thickness.

* * * * *